Patented June 27, 1950

2,512,996

UNITED STATES PATENT OFFICE 2,512,996

EPOXIDE COMPOSITIONS

Carl E. Bixler, Oldham County, Ky., assignor to Devoe & Raynolds Company, Inc., Louisville, Ky., a corporation of New York No Drawing. Application June 11, 1947,
Serial No. 754,079

12 Claims. (Cl. 260—47)

This invention has to do with a new and novel class of organic compositions. More particularly, the present invention relates to epoxide compositions which convert to water-insoluble infusible products.

As is well known to those familiar with organic resinous and plastic compositions, considerable investigation has been carried on for the development of organic bonding or cementing compositions. As a result, numerous compositions have been developed for bonding various surfaces, for example, wood to wood, wood to glass, glass to glass, wood to metals, bristle to bristle, etc. In view of the many and varied conditions to which such bonded surfaces are exposed, the bonding or cementing composition should be characterized by such properties as: high degree of adhesion; high rate of shear; resistance to water, acids, alkalies and other chemicals; satisfactory flow characteristics; electrical properties, for example, insulating capacity; satisfactory control during conversion to an infusible state, with the aid of a catalyst and/or heat; resistance to temperature change; etc. Although many of the organic bonding materials developed to date are satisfactory with regard to one or several of such properties, they are also characterized by the absence of one or more of the aforementioned desirable properties. Accordingly, considerable investigation has continued in an effort to develop a composition or class of compositions having all or substantially all of the aforesaid desired properties.

It has now been discovered that a new and novel class of epoxide-containing compositions possess substantially all of the aforementioned desired properties. The compositions of this invention are comprised of two epoxide-containing components in the proportions defined below. One epoxide-characterized component (A) is a liquid or low melting point polyepoxide, such as a simple polyepoxide typified by butane dioxide, or preferably is a more complex liquid polyepoxide formed by reaction of a polyhydric compound with an epihalohydrin followed by dehydrohalogenation. The second epoxide-characterized component (B) is a resinous ether epoxide prepared by reaction of an epihalohydrin with a polyhydric phenol in an alkaline medium, and has a melting or softening point not greater than about 65° C. and preferably greater than the melting point of the polyepoxide (A). Each of these epoxide-containing components of the compositions contemplated herein is described more fully hereinbelow.

The proportions of the polyepoxide (A) and of the resinous epoxide (B) fall within certain well-defined ranges in the formation of the compositions of this invention. One part by weight of polyepoxide (A) is used with from about ⅔ part to about 3 parts by weight of resinous epoxide (B), in order that the foregoing desired properties be realized. Preferred for use as a paint brush cement, for example, are those compositions obtained with 1 part by weight of epoxide (A), and with from about 1 part to about 1½ parts by weight of resinous epoxide (B).

Another valuable and related class of epoxide compositions of this invention comprise the aforesaid epoxide-characterized components, identified as (A) and (B) above, and a phenol (C). Illustrative of such phenols are phenol, resorcinol and bis phenol A. The latter material is a condensation product of phenol and acetone and is predominantly 4,4'-dihydroxy diphenyl dimethyl methane; small amounts of the 2,2- and 4,2' isomers may also be present.

When one or more phenols (C) is used in combination with the aforesaid epoxide components, (A) and (B), the proportions of each fall within the following ranges, all parts being by weight:

liquid polyepoxide (A)
  +                     1
resinous epoxide (B)
phenol (C), about 1/16 to about ⅕

Preferred of such compositions for paint brush cement, for example, are those in which the phenol component (C) is a polyhydric phenol, particularly a dihydric phenol such as bis phenol A. Particularly outstanding compositions are obtained when a dihydric phenol, such as bis phenol A, is used in the amount of about 15 parts, in combination with about 45 parts of liquid polyepoxide (A) and with about 40 parts of resinous epoxide (B).

Before describing in detail each of the epoxy-characterized components of the compositions contemplated herein, it should be understood that the terms "epoxide," "polyepoxide," "epoxy" and the like are used in the specification and in the appended claims to denote compounds having an ether oxygen atom joined to two adjacent or vicinal carbon atoms which, in turn, are joined to each other. Representative of such terms are the epoxy or cyclic ether groups present in ethylene oxide, epichlorhydrin and butane dioxide (that is, 1-2-epoxy-3-4-epoxy butane).

Polyepoxides (A)

As indicated hereinabove, one of the epoxide components is a simple polyepoxide or a complex polyepoxide having a relatively low melting or softening point below about 40° C. and preferably below 20° C. Examples of simple liquid polyepoxides are butane dioxide, bis-(2,3-epoxy propyl) ether (or diglycid ether), isoprene dioxide, hexadiene dioxides, limonene dioxide, etc. Two or more of such simple polyepoxides may be used in conjunction with the resinous epoxide (B), with or without the phenol (C).

The complex polyepoxides referred to above are those obtained by reaction of an epihalohydrin with a polyhydric alcohol, followed by dehydrohalogenation of the halohydrin composition formed by reaction of said epihalohydrin and polyhydric alcohol. Reaction of the epihalohydrin and polyhydric compound, preferably a polyhydric alcohol, is carried out in the presence of a suitable catalyst, of the type described below, and a halohydrin or mixture of halohydrins is formed. Thereafter, the halohydrin composition is dehydrohalogenated with an alkaline agent, of the type illustrated below, whereupon a polyepoxide or polyepoxide composition of low melting or softening point is formed. These compositions generally contain a small amount of halogen in relatively unreactive form, particularly halogen attached to a carbon atom which is not attached to a carbinol group.

Polyhydric alcohols which may be used for the preparation of the complex liquid polyepoxides are illustrated by the following:

Ethylene glycol
Propylene glycol
Trimethylene glycol
2,3-butanediol
Di-ethylene glycol
1,12 dihydroxy octadecane
2,2-dimethyl-1,3-propanediol
Glycerol
Diglycerol
Triglycerol
Trimethylol propane
Erythritol Pentaerythritol
Di-pentaerythritol
{ particularly when used in combination with ethylene oxide, ethylene glycol, glycerol and the like.

Mannitol
Dextrose
Polyallyl alcohol
Condensates of ethylene oxide and polyhydric alcohols.

In some cases, products obtained from certain of the foregoing polyhydric reactants may be somewhat more viscous than desired for use in the preferred compositions. In such cases, less viscous fractions may be isolated from the reaction product by distillation, solvent precipitation or other suitable procedures.

Epihalohydrins used in preparing the aforesaid complex polyepoxides have the general formula

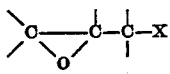

wherein X is a halogen atom, such as chlorine, bromine and iodine. Typical epihalohydrins are epichlorhydrin, epibromhydrin, and epiiodohydrin. The latter materials are all characterized by a three-carbon chain; however, analogs of the aforesaid epihalohydrins may also be used. Examples of the latter are beta-methyl epichlorhydrin and gammamethyl epichlorhydrin. It will be noted that epifluorhydrin and its analogs are not referred to above. Inasmuch as fluorine is rather unreactive in such epoxy compounds, the latter are not contemplated herein. In view of its availability and relatively low cost, epichlorhydrin is preferred.

As aforesaid, catalysts are used in reacting an epihalohydrin with a polyhydric compound, for the formation of a halohydrin or halohydrin-containing composition. Typical catalysts are those of the Friedel-Crafts type, including $AlCl_3$, $BF_3$, $ZnCl_2$, $FeCl_3$, $SnCl_4$ and complexes thereof such as the well known $BF_3$ etherates, etc.; acid type catalysts including HF, $H_2SO_4$, etc.; $SbCl_5$, etc.

In the formation of the halohydrins from epihalohydrins and polyhydric alcohols, for example, it is preferred that one molecule of epihalohydrin be used for each hydroxyl group of the polyhydric alcohol. While this is the preferred relationship, it is possible, however, to vary the proportions widely and yet obtain satisfactory halohydrin compositions which, upon dehydrohalogenation, provide polyepoxides.

The halohydrin compositions described above are dehydrohalogenated with a suitable alkaline material, preferably in the presence of an organic solvent. Alkaline materials which may be used are illustrated by NaOH, KOH, $Ca(OH)_2$, and alkali metal aluminates, silicates and zincates. Organic solvents advantageously used in the treatment are water-miscible, such as dioxane, acetone, methyl ethyl ketone, etc. Temperatures for the dehydrohalogenation are of the order of about 0° C. to about 100° C.

Further details of the character of these complex polyepoxides, (A) and of the preparation thereof are provided in application Serial No. 754,080, filed June 11, 1947, of J. D. Zech. The complex polyepoxides (A) and the preparation thereof are illustrated in the typical examples presented hereinbelow.

It is to be understood that two or more complex polyepoxides (A) may be used together, or in admixture with one or more simple liquid polyepoxides, the total quantity of such polyepoxides (A) falling within the ranges recited above.

Epoxides of epihalohydrins and polyhydric phenols (B)

As indicated above, the second epoxide-characterized component (B) of the compositions contemplated herein is one prepared by reaction of an epihalohydrin with a polyhydric phenol, the latter being in the form of its corresponding metal salt. The epoxide component is further characterized by a melting or softening point (Durran's Mercury Method) of not greater than about 65° C., and is resinous and polymeric in character. In addition to an epoxide group or groups, this component also contains ether linkages and hydroxyl groups.

The foregoing resinous epoxide components (B) may also be identified by their epoxy equivalent. In general, the epoxy content will be from about 110 to about 500. The epoxide group content is determined by measuring the equivalent weight of the composition per epoxide group. The method used involves heating one gram sample of the epoxide composition with an excess of pyridine containing pyridine hydrochloride, at the boiling point for 20 minutes, and back titrating the excess pyridine hydrochloride with 0.1 normal sodium hydroxide, using phenolphthalein as indicator. One HCl is considered equivalent to one epoxide group. The pyridine-pyridine hydrochloride solution is made by adding 16 ccs. of concentrated hydrochloric acid per liter of pyridine.

The epihalohydrin-polyhydric phenol reaction products are preferably prepared by reacting about one mol of epihalohydrin for each hydroxyl group of the polyhydric phenol. For example, if a dihydric phenol is used, about two (2) mols of an epihalohydrin is used with about one (1) mol of dihydric phenol. Caustic alkali is used in the reaction in amounts sufficient to combine with the halogen of the epihalohydrin reactant; preferably, an excess of alkali is used to insure substantially complete removal of halogen. It will be understood that other strong aqueous alkalies may also be used; for example, potassium and lithium hydroxides.

While epichlorhydrin is the preferred epihalohydrin for these epoxide compositions (B), homologs thereof may be used advantageously. For example, epibromhydrin may be used. As indicated above, however, in connection with the liquid epoxide compositions (A), prepared from epihalohydrins followed by dehydrohalogenation, the epifluorhydrins are not contemplated in view of the low degree of reactivity of the fluorine in such compounds.

Polyhydric phenols used in the preparation of these epoxide compositions (B) are typified by resorcinol; hydroquinone; bis phenols, such as bis phenol A, predominantly 4-4'-dihydroxydiphenyl dimethyl methane, with lesser quantities of the 2,2- and 4,2'-isomers present. Preferred polyhydric phenols are dihydric phenols whose mono alkali metal salts have a pH from about 7 to 11; examples of such dihydric phenols are those recited above. Particularly preferred, however, is bis phenol A.

In the preparation of the resinous polymeric epoxides (B), the aqueous alkali, bis phenol and epichlorhydrin, for example, are advantageously added together at the outset. In such a procedure, the aqueous alkali serves to dissolve the bis phenol, with the formation of the corresponding monophenoxide and diphenoxide alkali salts. Alternatively, the alkali and bis phenol may be admixed, and the epichlorhydrin added thereto; or, an aqueous solution of alkali and bis phenol may be added to the epichlorhydrin. Reaction takes place with the evolution of heat, which serves to further the reaction. The rise in temperature of the reactants may be controlled by regulating the amount of water used in the form of aqueous alkali. Also, the temperature may be controlled by circulating a suitable heat transfer medium about the exterior walls of the vessel or apparatus in which the reaction takes place. Such means are well known in the art. Heat is applied to complete the reaction, the temperature generally being maintained at about 80–110° C. for a sufficient length of time. Depending upon the quantities of reactants used and the temperature of reaction, the time required for complete reaction generally varies from about thirty minutes to three hours or more. The reaction conditions are illustrated by the typical examples set forth hereinafter.

As the reaction proceeds, the reaction mixture separates into an upper aqueous layer which is drawn off and the residue, generally of taffy-like consistency, settles to the bottom of the reaction vessel. The residue is then washed with hot water, continuously or intermittently, for a short period of time. The residue and hot water are agitated thoroughly. The wash water is drawn off. The washing procedure may be repeated several times, as necessary, to effect removal of any unreacted alkali and the by-product sodium chloride, for example. Dilute acids, such as acetic or hydrochloric, may be used to neutralize excess alkali during the washing procedure. It is usually desirable to wash the product entirely free from alkali and salt, inasmuch as unreacted alkali or basic salts such as sodium acetate, may induce further polymerization during the drying process, when heat is applied to remove the final traces of water. The wet product or resin may be dried by heating and stirring until the temperature rises substantially above the boiling point of water, or by other suitable means.

While certain organic solvents may be used instead of water in the preparation of the resinous epoxides, the use of water is preferred. When organic solvents, in which the reaction product is soluble, are used, the reaction product can be freed from salts in some cases by filtration and the product then recovered by distillation of the solvent. In the case of products which are soluble or partially soluble in hot water, in which the by-product salt is also soluble, an organic solvent may be used advantageously; in such case, the product can be freed from by-product salt by filtration. When an organic solvent is used it should be one which does not react with the reactants or reaction products.

Once again, it is to be understood that two or more resinous epoxides (B) of the character defined above, may be used with the afore-mentioned polyepoxides (A). In such case, the total quantity of resinous epoxides (B) will come within the ranges defined above.

*Phenols (C)*

Particularly valuable bonding or cementing compositions are obtained by incorporating a phenol (C) with the aforesaid epoxides, (A) and (B), in the proportions recited above. Such compositions are unusually durable when converted to an infusible state with a suitable catalyst of the type described below. Illustrative of the phenols which may be used advantageously are phenol; cresols; resorcinol; hydroquinone; catechol; bis phenols, such as bis phenol A and dichlor bis phenol A. Preferred, however, are polyhydric phenols such as recited above. Particularly preferred are bis phenol A and its dichlor analog.

It should be clear from the foregoing that two or more of said phenols (C) may be used in admixture with the aforesaid epoxide components, (A) and (B). The quantity of the phenols (C), in such case, will be within the ranges set forth above.

*Converting catalysts*

When the aforesaid epoxide components, (A) and (B), with or without a phenol (C), are treated with a suitable catalyst, water-insoluble, high melting, infusible products are formed. These products are complex polymeric ether materials, apparently formed by direct addition of epoxy and hydroxyl groups. Converting catalysts useful here include alkalies, such as sodium and potassium hydroxides; alkali phenoxides, for example, sodium phenoxide; acids such as phosphoric acid, partial esters of phosphoric acid such as diethylortho phosphate and hexaethyl tetraphosphate; polyfunctional aliphatic amines typified by diethylene triamine, triethylene tetramine, etc.; Friedel-Crafts type such as $AlCl_3$, $ZnCl_2$, $FeCl_3$, $BF_3$ and complexes thereof, including ethers, acid anhydrides, amines, amides, sulfides, diazonium salts, etc. For the purpose of binding bristles to other bristles, natural or synthetic, the aliphatic amines have not proven as satisfactory as other converting catalysts, such as the alkalies; however, the aliphatic amines are quite satisfactory for such purposes as bonding wood to wood, etc.

The concentration of converting catalyst is generally of the order of less than one per cent to about 10 per cent (based on the total weight of the composition) and varies with individual catalysts. For example, satisfactory results have been obtained with from 2 to 4 per cent (solid) potassium hydroxide, in the form of a 50 per cent water solution. Alkali phenoxides are also used, in general, in amounts of the order of 2 to 4 per cent. Aliphatic amines are preferably used in amounts from about 5 to about 10 per cent. Friedel-Crafts type catalysts provide satisfactory conversion when used in amounts of 1–10 per cent.

*Preparation of bonding material*

Water-insoluble, infusible bonding materials may be formed of the foregoing epoxides, (A) and (B), with or without a phenol (C), by combining the individual components in any one of a number of ways. For example, the epoxides, (A) and (B), may be thoroughly admixed in the proportions indicated above and a converting catalyst added thereto at a suitable temperature. One particularly advantageous procedure involves thorough admixture of the epoxide components, (A) and (B), with or without phenol (C), and a catalyst at a temperature of the order of 0° C. to about 20° C. In this way a uniform distribution of the catalyst throughout the composition is obtained and premature polymerization or conversion of the composition is minimized. When aqueous alkali is used as the catalyst, it is preferred that the catalyzed composition be allowed to stand at 20–40° C. for several hours, to avoid foaming of the composition when the latter is heated. Thereafter, the temperature of the composition is raised, as to 30° C. to about 150° C., whereupon polymerization or conversion proceeds with the formation of the desired infusible, water-insoluble bonding material.

It has been found that the composition comprised of epoxides (A) and (B), with or without a phenol (C), but without a catalyst, may be prepared and stored at a temperature below that at which substantial polymerization occurs, as temperatures up to about 40° C., before use as a cementing or bonding material. As a polymerization retarder or inhibitor, various acidic materials such as organic acids may be used in small concentrations. For example, oxalic acid—either anhydrous or hydrated—will inhibit polymerization; concentrations providing satisfactory inhibition are in the neighborhood of 0.05 to 0.5 per cent, particularly 0.10 per cent, based on the total weight of the composition. Also, the composition may be prepared immediately prior to use following the illustrative procedures referred to above.

As indicated above, preferred compositions for use as paint brush cements are comprised of epoxides (A) and (B) and a dihydric phenol (C). Such compositions generally have viscosities from about 100 to about 1500 poises (at 25° C.); particularly preferred are those within the range of 300–600 poises. By way of illustration, a composition of epoxides (A) and (B), with a dehydric phenol (C), and without a catalyst, had an initial viscosity of about 300 poises; on standing for a month, the viscosity was 560 poises.

It has also been found that a composition comprised of epoxides (A) and (B), with or without a phenol (C), and with a catalyst, may be prepared and stored for periods ranging from several hours to several days at temperatures of 20° C. or less before use as a cementing or bonding material. For example, such a composition may be satisfactorily stored for about 6 hours at 20° C., or for correspondingly longer periods of time at lower temperatures.

*Illustrative examples*

The following examples are provided to illustrate the invention, and are not to be construed as limitations. The examples illustrate the individual components which cooperate to provide the final compositions, procedures for preparing the same and the final compositions. In the examples, and in the appended claims, all parts are by weight unless otherwise indicated.

I. *Complex liquid polyepoxide (A)*

A complex liquid polyepoxide was prepared by reacting one molecule of glycerin with substantially three molecules of epichlorhydrin, followed by dehydrohalogenation, according to the following procedure:

In a reaction vessel provided with a mechanical stirrer and external cooling means was placed a quantity of 276 parts of glycerol and 828 parts of epichlorhydrin, and to this reaction mixture was added one part of 45% boron trifluoride ether solution diluted with nine (9) parts of ether. The reaction mixture was agitated continuously, the temperature rising to 50° C. during a period of one hour and 44 minutes, at which time external cooling with ice water was applied. The temperature of the reaction mixture was maintained between 49° C. and 77° C. for one hour and 21 minutes.

To 370 parts of the product formed from glycerol and epichlorhydrin, was added 900 parts of dioxane and 300 parts of powdered sodium aluminate ($Na_2Al_2O_4$), in a reaction vessel provided with a mechanical agitator and a reflux condenser. The reaction mixture thus formed was continuously agitated and gradually heated to 93° C. during a period of one hour and 51 minutes. The temperature was held at 93° C. for a period of eight hours and 49 minutes. The reaction mixture was then cooled to room temperature (20–25° C.) and the inorganic material, such as sodium chloride and aluminum oxide, was removed by filtration of the cooled mixture. Dioxane and low boiling products were removed by heating the filtrate to 205° C. at 20 mms. pressure, whereupon 261 parts of a pale yellow product was obtained as a residue. This product had a viscosity of C-E (Gardner-Holt Scale) and, therefore, a softening point (Durran's Mercury Method) substantially below 20° C. The product had an equivalent weight to epoxide of 149. The product is identified hereinafter as liquid polyepoxide I.

II. Complex liquid polyepoxide (A)

In a reaction vessel fitted with a thermometer, reflux condenser, gas inlet tube and electrically-driven stirrer, were placed 272 grams of powdered pentaerythritol, 124 grams (2 mols) of ethylene glycol and 6 ccs. of a $BF_3$-ethyl ether solution (45% $BF_3$). The reaction mixture thus formed was heated to about 135° C., whereupon ethylene oxide was introduced therein through the gas inlet tube. The mixture was then heated at 130–138° C. for 1 hour and 18 minutes. Ethylene oxide addition was discontinued and 136 grams of pentaerythritol (total used, 402 grams; 3 mols) were added to the reaction mixture. Following addition of pentaerythritol, the mixture was heated at 125–130° C. for 50 minutes. Ethylene oxide was then introduced through the gas inlet tube, for 3 hours at 125–170° C. The total quantity of ethylene oxide so introduced was 202 grams (4.6 mols).

The resulting reaction mixture was transferred to a reaction vessel, fitted with thermometer, reflux condenser and electrically-driven stirrer, and heated to 120° C. Six (6) ccs. of the $BF_3$-ethyl ether solution were added. Epichlorhydrin (1570 grams; 17 mols) was then added during a period of 2 hours and 25 minutes, during which period the temperature varied from 97° C. to 118° C.

A quantity, 231 grams of the epichlorhydrin reaction product so obtained was placed in a reaction vessel equipped with a thermometer, reflux condenser and electrically-driven stirrer. Three hundred (300) ccs. of dioxane, 20 ccs. of water, and 170 grams of sodium aluminate ($NA_2Al_2O_4$) were added. The reaction mixture thus formed was continuously agitated and heated at about 96° C. for 3 hours. The reaction mixture was treated as described in Example I above, except that the vacuum distillation was continued to 200° C. at 3 mms. pressure. The product, 159 grams, was a clear, very pale yellow liquid, having a viscosity of H(G.-H. Scale). The product also had an epoxide equivalent of 161 and an average molecular weight of 360 (determined by standard freezing point method with benzophenone); this corresponds to an average of about 2.2 epoxide groups per molecule. The product is identified herein as liquid polyepoxide II.

III. Resinous epoxide (B)

Bis phenol A (798 parts) was dissolved in a caustic soda solution made by dissolving 200 parts of caustic soda in 1730 parts of water, in a stainless steel closed-kettle. Epichlorhydrin (650 parts) was added in one portion to the closed kettle. The kettle was provided with a stirrer and the mixture was stirred during the process. The temperature rose from about 37° C. to about 70° C. in about 45 minutes. Caustic soda, 80 parts in 200 parts of water, was then added, whereupon the temperature rose to about 82° C. during the course of about 30 minutes. Additional caustic soda, 29 parts in 100 parts of water, was then added and the kettle was heated. The temperature of the reaction mixture was gradually increased to about 95° C. in about 30 minutes. The aqueous liquor was drawn off from the taffy-like product which had formed. The latter was washed with hot water, while agitated, and a series of four washing treatments with fresh water was applied until the product was neutral to litmus. The product was then dried by heating to a final temperature of 130° C., and removed from the kettle to suitable containers. The product is referred to hereinafter as resinous epoxide I.

In this example, two mols of epichlorhydrin are used with one mol of bis phenol A, with an amount of caustic soda somewhat in excess of two mols. The softening point of the resinous epoxide, determined by Durran's Mercury Method, was 43° C. The product had an epoxide equivalent of 325.

IV. Epoxide composition (A), (B) and (C)

A particularly outstanding bonding composition is one comprised of the following:

| | Parts by weight |
|---|---|
| Liquid polyepoxide I | 45 |
| Resinous epoxide I | 40 |
| Bis phenol A | 15 |
| Oxalic acid (anhydrous) | 0.1 |

The composition is advantageously formed by adding bis phenol A to the liquid polyepoxide (I), while agitating and heating the same at 50–60° C., for about three hours, or until the bis phenol A has dissolved. The oxalic acid is added to the bis phenol A-polyepoxide I mixture. Then, the resinous epoxide I is melted and added to the bis phenol A-polyepoxide-oxalic acid mixture, while agitating and heating the latter at 50–60° C. for about ½ hour. The composition is stable, little or no increase in viscosity taking place during a two month storage period.

This composition converts to a water-insoluble, infusible product when a suitable converting catalyst is used therewith. For example, about 2% (by weight) of KOH, in a 50% aqueous solution, is thoroughly admixed with the composition at about 15° C., and the resulting mixture is allowed to stand at 25° C. until solid, a period of about 4 hours. The solid, when heated to about 100–120° C. for 4–6 hours, forms an excellent infusible product.

The infusible product is uniform in character; not characterized by voids or bubbles from entrapped volatile material, as is the case with many infusible materials. The high degree of solvent resistance of the product is demonstrated by tests with various solvents. A rod-shaped portion of the product was totally immersed in a solvent for seven days at a temperature of about 25° C. A rod was measured before immersion and following the seven day test period. Solvents used were water, alcohol, acetone and benzene. After seven days, the volumetric swelling or increase in volume of each test rod was: with water, 1.80%; with alcohol, 1.86%; with acetone, 5.2%; and with benzene, 0.8%.

A further characteristic of the bonding composition is good adhesion to metal, glass, wood, filaments or fibres, and the like. In view of these desirable features, the composition has considerable application. One typical application is as a cement for brushes, wherein it acts as a cementing or bonding material for the bristles and the dividers, spacers or plugs to which bundles of the bristles are secured. The cement is particularly useful in paint brushes in view of its resistance to various solvents, particularly hydrocarbon solvents, which are used to clean such brushes. It is greatly superior in this regard to the conventional rubber-type cements which have been in use during the past fifty years.

V. Epoxide compositions (A), (B) and (C)

Additional examples with the materials shown in Example IV and the character of the same are shown in the following tabulation:

| Liquid Polyepoxide I | Resinous Expoxide I | Bis Phenol A | Viscosity |
|---|---|---|---|
| Per Cent | Per Cent | Per Cent | Poises |
| 52.5 | 30 | 17.5 | 112.5 |
| 48.75 | 35 | 16.25 | 146.0 |
| 45 | 40 | 15 | 292.5 |
| 41.25 | 45 | 13.75 | 440.0 |
| 37.5 | 50 | 12.5 | 650.0 |

VI. Epoxide compositions (A), (B) and (C)

Parts by weight
Liquid polyepoxide II _____ 45
Resinous epoxide I _____ 40
Bis phenol A _____ 15
Oxalic acid (anhydrous) _____ 0.1

The foregoing materials were brought together in the manner described in Example IV above. The infusible product formed in this way was similar in character to the product formed in Example II; however, it was characterized by greater swelling resistance to water and acetone, and was somewhat harder.

VII. Epoxide composition (A) and (B)

Parts by weight
Liquid polyepoxide I _____ 50
Resinous epoxide I _____ 50

The two epoxides were thoroughly mixed with 6 per cent by weight of aqueous potassium hydroxide (3% based on solid KOH). The mixture thus formed was allowed to stand at 20–25° C. for 16 hours, and then heated at 110° C. for 4 hours. A clear, hard, infusible product was formed; it was resistant to water, acetone and hydrocarbons, such as aliphatic materials and aromatics, typified by benzene and toluene.

Uses

From the foregoing illustrative material, it will be seen that the present invention provides initial compositions of epoxides, with or without phenols. It will also be seen that such initial compositions are capable of conversion to infusible products.

These compositions may be used directly in making liquid coating compositions and in making molded articles and the like. They may also be used as impregnating materials with paper, fabrics, wood, etc. Laminated articles provide still another use for these compositions; for example, plastic sheets may be bonded together, so also may sheets of wood, glass and metal. As indicated above, one particularly valuable application is as a brush cement, such as in paint brushes.

Further, they may be used alone or combined with other substance. The latter include dyes, pigments, fillers, resins and the like, particularly in making molded articles. For example, wood flour has been used with a composition comprised of polyepoxide I, resinous epoxide I and bis phenol A, and molded in the form of spheres; the spheres have excellent impact resistance. They may also be used as stabilizers for halogen-containing synthetic resins or elastomers which have a tendency to evolve hydrochloric acid.

It is to be understood that the illustrations provided hereinabove serve to typify the invention and are not to be considered as limitations thereof; rather, the invention is to be broadly construed in the light of the language of the appended claims.

I claim:

1. A composition capable of conversion to water-insoluble, infusible products, said composition comprising (A) an aliphatic polyepoxide with a plurality of epoxide groups and free from functional groups other than alcoholic hydroxyl and epoxide groups and having a softening point below 40° C. and (B) a resinous ether epoxide having a softening point not greater than about 65° C. prepared by reaction of about 2 mols of epichlorhydrin and of alkali with 1 mol of a polyhydric phenol free from functional groups other than phenolic hydroxyl groups, in the proportions of 1 part of polyepoxide (A) to from about ⅔ part to about 3 parts of resinous epoxide (B).

2. A composition capable of conversion to water-insoluble, infusible products, said composition comprising (A) an aliphatic polyepoxide with a plurality of epoxide groups and free from functional groups other than alcoholic hydroxyl and epoxide groups and having a softening point below 20° C. and (B) a resinous ether epoxide having a softening point not greater than about 65° C., prepared by reaction of about 2 mols of epichlorhydrin and of alkali with 1 mol of a polyhydric phenol free from functional groups other than phenolic hydroxyl groups, in the proportions of 1 part of polyepoxide (A) to from about ⅔ part to about 3 parts of resinous epoxide (B).

3. A composition as defined in claim 2 in which the polyepoxide (A) is a polyglycide ether derivative of a polyhydric alcohol containing at least three hydroxyl groups and resulting from the reaction in a substantially non-aqueous medium of a polychlorhydrin ether of the alcohol with a basic reacting composition selected from the group consisting of an alkali metal aluminate, an alkali metal silicate and an alkali metal zincate.

4. A composition as defined in claim 2, in which the polyepoxide (A) is a polyglycide derivative of glycerol resulting from the reaction of glycerol with epichlorhydrin in the proportions of about 1 mol of epichlorhydrin to each hydroxyl group of the glycerin to form a polychlorhydrin ether, and reaction of said polychlorhydrin ether in a substantially non-aqueous medium with a basic reaction composition selected from the group consisting of an alkali metal aluminate, an alkali metal silicate and an alkali metal zincate, and in which the resinous epoxide (B) is prepared by reaction of about 2 mols of epichlorhydrin and of alkali with 1 mol of dihydroxy diphenyl dimethyl methane and has a softening point of about 43° C.

5. A composition capable of conversion to water-insoluble, infusible products, said composition comprising (A) about 1 part by weight of an aliphatic polyepoxide with a plurality of epoxide groups and free from functional groups other than alcoholic hydroxyl and epoxide groups and having a softening point below about 20° C., and (B) about 1 part by weight of a resinous ether epoxide having a softening point of about 43° C.; the polyepoxide (A) being a polyglycide derivative of glycerol resulting from the reaction of glycerol with epichlorhydrin in the proportions of about 1 mol of epichlorhydrin to each hydroxyl group of the glycerin to form a polychlorhydrin ether, and reaction of said polychlorhydrin ether in a substantially non-aqueous medium with a basic reaction composition selected from the group consisting of an alkali metal aluminate, an alkali metal silicate and an alkali metal zincate, and the resinous epoxide (B) being prepared by reaction of about 2 mols of epichlorhydrin and of alkali with 1 mol of dihydroxy diphenyl dimethyl methane.

6. A composition as defined in claim 1 which also contains from about $\frac{1}{10}$ to $\frac{1}{5}$ part of a phenol having no reactive groups other than hydroxyl for each one part of polyepoxide composition (polyepoxide (A) plus resinous epoxide (B)).

7. A composition as defined in claim 2 which also contains from about $\frac{1}{10}$ to $\frac{1}{5}$ part of a dihydric phenol having no reactive groups other than hydroxyl for each one part of polyepoxide composition (polyepoxide (A) plus resinous epoxide (B)).

8. A composition as defined in claim 2 which also contains from about $\frac{1}{10}$ to about $\frac{1}{5}$ part of a dihydric phenol having no reactive groups other than hydroxyl for each one part of the epoxide composition (polyepoxide (A) plus resinous epoxide (B)), the polyepoxide (A) being a polyglycide ether derivative of a polyhydric alchol resulting from the reaction in a substantially non-aqueous medium of a polychlorhydrin ether of the alchol with a basic reacting composition selected from the group consisting of an alkali metal aluminate, an alkali metal silicate and an alkali metal zincate.

9. A composition as defined in claim 2 which also contains from about $\frac{1}{10}$ to about $\frac{1}{5}$ part of a dihydric phenol having no reactive groups other than hydroxyl for each one part of the epoxide composition (polyepoxide (A) plus resinous epoxide (B)), the resinous epoxide (B) being prepared by reaction of about 2 mols of epichlorhydrin and of alkali with 1 mol of dihydroxy diphenyl dimethyl methane and having a softening point of about 43° C.

10. A composition as defined in claim 2 which also contains from about $\frac{1}{10}$ to about $\frac{1}{5}$ part of a dihydric phenol having no reactive groups other than hydroxyl for each one part of the epoxide composition (polyepoxide (A) plus resinous epoxide (B)), the polyepoxide (B) being a polyglycide derivative of glycerol resulting from the reaction of glycerol with epichlorhydrin in the proportions of about 1 mol of epichlorhydrin to each hydroxyl group of the glycerin to form a polychlorhydrin ether, and reaction of said polychlorhydrin ether in a substantially non-aqueous medium with a basic reaction composition selected from the group consisting of an alkali metal aluminate, an alkali metal silicate, and an alkali metal zincate, and the resinous epoxide (B) being prepared by reaction of about 2 mols of epichlorhydrin and of an alkali with 1 mol of dihydroxy diphenyl dimethyl methane and having a softening point of about 43° C.

11. A composition capable of conversion to water-insoluble, infusible products said composition comprising about 45 parts by weight of an aliphatic polyepoxide with a plurality of epoxide groups and free from functional groups other than alcoholic hydroxyl and epoxide groups and having a softening point below 20° C., about 40 parts by weight of a resinous ether epoxide, having a softening point of about 43° C. and prepared by reaction of about 2 mols of epichlorhydrin and of alkali with 1 mol of dihydroxy diphenyl dimethyl methane, and about 15 parts of dihydroxy diphenyl dimethyl methane.

12. A composition as defined in claim 11 in which the aliphatic polyepoxide is prepared by the reaction of 1 molar proportion of glycerol with about 3 molar proportions of epichlorhydrin to form a polychlorhydrin ether, and reaction of said polychlorhydrin ether in a substantially non-aqueous medium with a basic reaction composition selected from the group consisting of an alkali metal aluminate, an alkali metal silicate and an alkali metal zincate.

CARL E. BIXLER.

REFERENCES CITED

The following references are of record in the file of this patent:

UNITED STATES PATENTS

| Number | Name | Date |
| --- | --- | --- |
| 2,324,483 | Castan | July 20, 1943 |

FOREIGN PATENTS

| Number | Country | Date |
| --- | --- | --- |
| 579,698 | Great Britain | Aug. 13, 1946 |